Dec. 29, 1931.  R. T. KNAPP  1,838,628
APPARATUS FOR MEASURING FINENESS OF FINELY DIVIDED MATERIALS
Filed March 23, 1929  6 Sheets-Sheet 1

INVENTOR
Robert T. Knapp
BY
ATTORNEYS

Dec. 29, 1931.  R. T. KNAPP  1,838,628
APPARATUS FOR MEASURING FINENESS OF FINELY DIVIDED MATERIALS
Filed March 23, 1929  6 Sheets-Sheet 2

INVENTOR.
Robert T. Knapp
BY
ATTORNEYS.

Dec. 29, 1931.  R. T. KNAPP  1,838,628
APPARATUS FOR MEASURING FINENESS OF FINELY DIVIDED MATERIALS
Filed March 23, 1929   6 Sheets-Sheet 3

INVENTOR
Robert T. Knapp
BY Arthur P. Knight and
Alfred W. Knight
ATTORNEYS

Dec. 29, 1931.    R. T. KNAPP    1,838,628
APPARATUS FOR MEASURING FINENESS OF FINELY DIVIDED MATERIALS
Filed March 23, 1929    6 Sheets-Sheet 4

INVENTOR
Robert T. Knapp.
BY Arthur P. Knight and
Alfred W. Knight
ATTORNEYS

Dec. 29, 1931. R. T. KNAPP 1,838,628
APPARATUS FOR MEASURING FINENESS OF FINELY DIVIDED MATERIALS
Filed March 23, 1929 6 Sheets-Sheet 5

INVENTOR
Robert T. Knapp
BY Arthur P. Knight and
Alfred W. Knight
ATTORNEYS

INVENTOR
Robert T. Knapp
BY Arthur P. Knight and
Alfred W. Knight
ATTORNEYS

Patented Dec. 29, 1931

1,838,628

UNITED STATES PATENT OFFICE

ROBERT T. KNAPP, OF PASADENA, CALIFORNIA, ASSIGNOR TO RIVERSIDE CEMENT COMPANY, OF LOS ANGELES, CALIFORNIA, A CORPORATION OF DELAWARE

APPARATUS FOR MEASURING FINENESS OF FINELY DIVIDED MATERIALS

Application filed March 23, 1929. Serial No. 349,376.

This invention relates to the measurement of the fineness, or the proportions of particles of different sizes, in finely divided materials. While the apparatus is intended particularly for measurement of the fineness of the finer portions of ground Portland cement, it will be evident that it is equally adapted for similar measurements on any solid material in a finely divided state. It is particularly useful in connection with Portland cement or other hydraulic cements, however, because the properties of such materials, such as strength and time of set, have been found to depend largely upon the relative proportions of particles of different very small particle sizes, and it has been difficult, by the means heretofore available, to obtain any accurate measurement of such proportions. It is possible, as for example by screen tests, to determine the proportions of particles of different sizes, down to a certain point, namely about 200 mesh, but such screen tests, as well as other means heretofore tried, have been unsatisfactory for classifying the extremely fine material, for example, material below 200 mesh.

The principal object of this invention is to provide for the accurate measurement of the gradations of fineness in such finely divided materials, and particularly to provide an apparatus for this purpose which is rapid and simple in operation and which is accurate and dependable in results.

A further object is to provide an apparatus in which the measurements are recorded, so as to give a permanent record of each test.

A further object is to provide an apparatus having means for accurately maintaining a constant temperature, so as to always give results which are comparable.

A further object is to provide an apparatus which requires a minimum amount of attention from an operator.

The apparatus which I use for measuring the fineness of such materials is based upon the different rates of settling, in a suitable liquid medium, of solid particles of different sizes placed in suspension therein, and upon the variation in the pressure head at a given point of measurement in the liquid medium, as the particles of different sizes progressively settle out of the liquid above said point of measurement. This variation in pressure head is due to a variation in the mean density of the liquid-solid suspension as the solid particles gradually settle out, the height of the liquid above said point of measurement remaining constant because the particles after settling displace the same volume of liquid as when they were in suspension.

The liquid medium in which the material is suspended should be a liquid whose density is less than that of the solid particles, and which is incapable of dissolving, reacting with, or otherwise affecting the physical properties of the solid particles. Furthermore, the viscosity of the liquid should be such as to permit settling of substantially all of the solid material, or the major portion thereof, within a reasonable period of time. For use with Portland cement, for example, a suitable liquid medium is kerosene or other liquid hydrocarbon of similar properties. Water is, of course, not suitable for use in this case, as it would cause the cement to set or harden in the apparatus, but for use with materials other than hydraulic cements, and which are not soluble in or affected by water, it may be employed satisfactorily.

The density and viscosity of the liquid medium in which the rate of settling of the material is measured are very important factors in determining such rate of settling, and both of these, and particularly the viscosity, are affected by variations in temperature. The apparatus, therefore, also includes means for maintaining the temperature of said liquid medium substantially constant.

For recording or measuring the variations in pressure head at the point of measurement, I prefer to employ novel means, which are hereinafter described and which also constitute part of this invention, for causing variations in the direction of reflection of a beam of light in response to such variations in pressure, and for producing a photographic record of the changes in position of said beam of light during the progress of the settling operation.

The accompanying drawings illustrate an apparatus embodying my invention, and referring thereto:—

Figures 1, 1A:
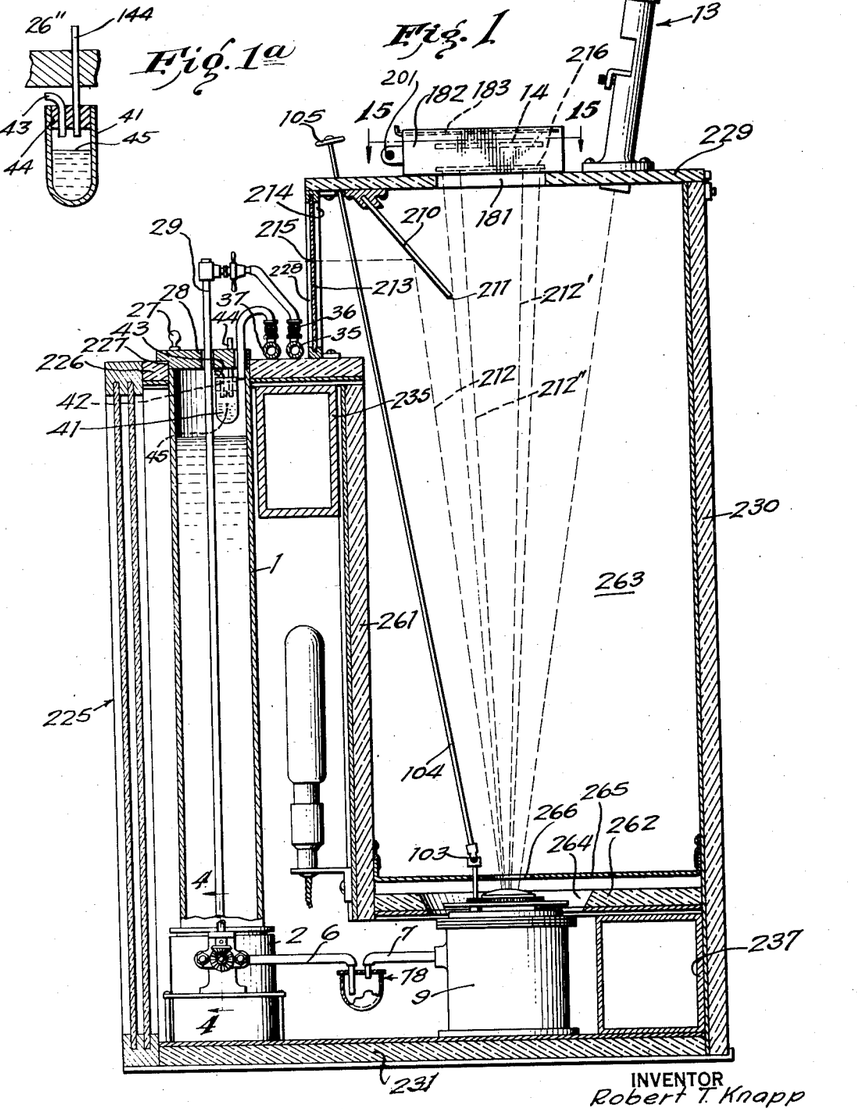
Fig. 1 is a transverse vertical section of a testing unit according to my invention.
Fig. 1a is a vertical section of an advantageous form of breathing device for preventing loss of vapors from the settling tube.
Figure 2:
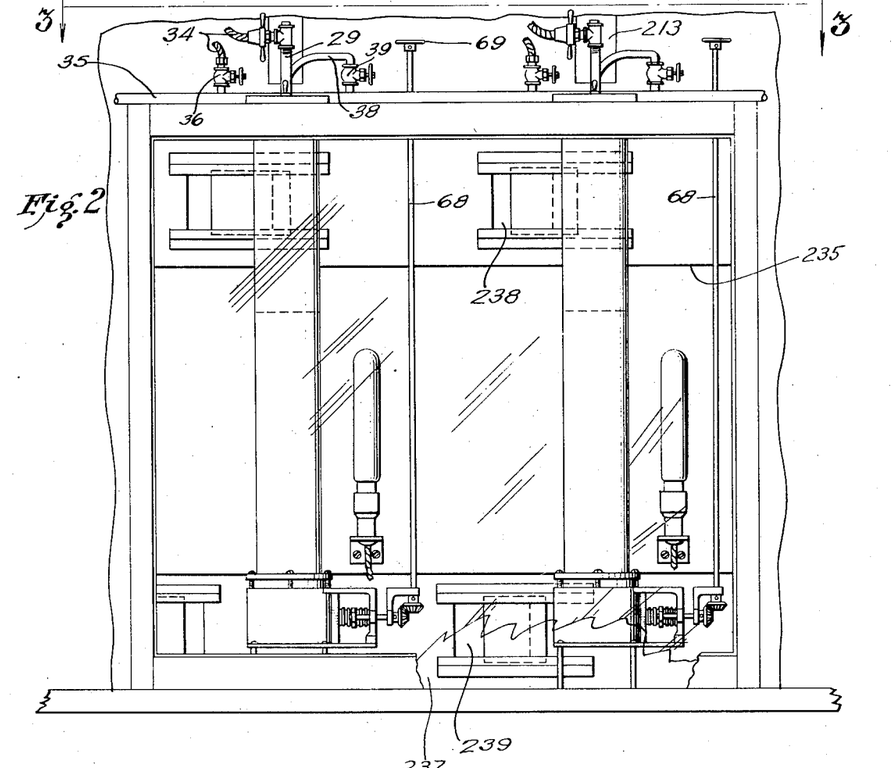
Fig. 2 is a front view showing two testing units mounted side by side in a single cabinet, it being understood that any number of units may be so mounted.

Each testing unit, as shown in Figs. 1 and 2, comprises a settling tube 1 which is preferably of glass or other transparent material, with its lower end mounted in and secured to a base 2 having a recess 3 (see Fig. 4) of a diameter substantially equal to the internal diameter of tube 1, said recess constituting in effect a downward extension of the settling tube. Pressure is communicated from a point near the bottom of said settling tube, for example, a point within the recess 3, through pipes 6 and 7 to the pressure chamber 8 of the pressure responsive means 9 (see Fig. 6). A pressure responsive element 11 is mounted within the pressure responsive means 9 and subject to the pressure in chamber 8, and is connected to tilt a mirror 12 to different angular positions in accordance with variation in said pressure. Means indicated at 13 are provided for producing a beam of light of definite size and shape and for directing the same upon the mirror 12, so that the direction in which said beam of light is reflected from said mirror depends upon the angular position of the mirror. The movements of the beam of light due to tilting of the mirror take place in a vertical plane perpendicular to the axis about which the mirror is tilted, that is to say, in a plane extending from front to rear of the apparatus or from left to right in Fig. 1, so that the beam of light will fall in different positions upon a photographic plate in the position indicated at 14 in Fig. 1. Means such as hereinafter described are also provided for moving said photographic plate in a direction perpendicular to the plane of movement of the light beam, so as to cause said light beam to trace a line upon said plate which will furnish a record of the movement of the light beam. In order to permit the testing of a number of samples concurrently, I prefer to mount a number of these testing units side by side within a suitable housing, as shown in Figs. 1 and 2. Said housing preferably includes a transparent front wall 225 of glass or the like, and will be more fully described hereinafter. For maintaining a constant temperature within said housing, I provide two air circulating flues 235 and 237, provided respectively with adjustable openings 238 and 239. Air, or other gaseous medium, maintained at constant temperature in any suitable manner, may be supplied through one of said flues and withdrawn through the other flue. Having now referred briefly to the several essential elements of the testing apparatus, and explained in a general way their relation to one another, I will next proceed to describe these several elements in somewhat greater detail.

Figure 3:
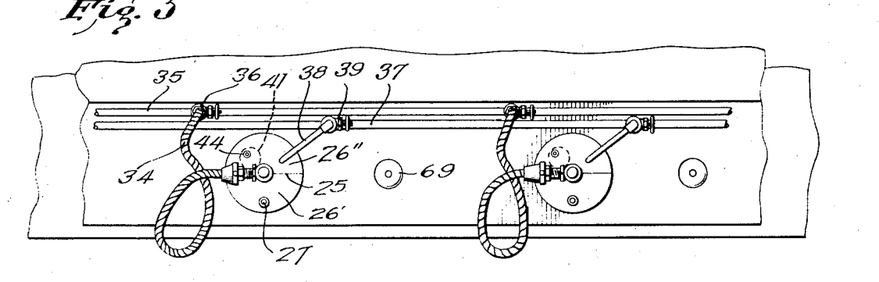
Fig. 3 is a plan view, on line 3—3 in Fig. 2.

The settling tube 1 which, as above stated, is preferably made of glass, may be of any suitable height so as to provide a convenient time of settling of the material therein. Such tube may, for example, have a height of from 20 to 30 inches although no definite limitation need be imposed on such height. The lower end of said tube rests upon a shoulder 21 in the base 1 and is secured tightly therein in such manner as to entirely prevent leakage of liquid therefrom, as for example by means of suitable packing material 22 held in place by a flanged ring 23. Said ring may be pressed down upon the packing 22 as by means of screws 24 so as to compress said packing material sufficiently to provide a tight fit. A suitable cover is provided for the settling tube, said cover being preferably split as indicated at 25 in Fig. 3 into two portions 26' and 26'', so that the front cover portion 26' may be removed independently of the rear portion 26'', said front cover portion being provided with a suitable handle or knob 27 to facilitate removal thereof.

Figure 4:
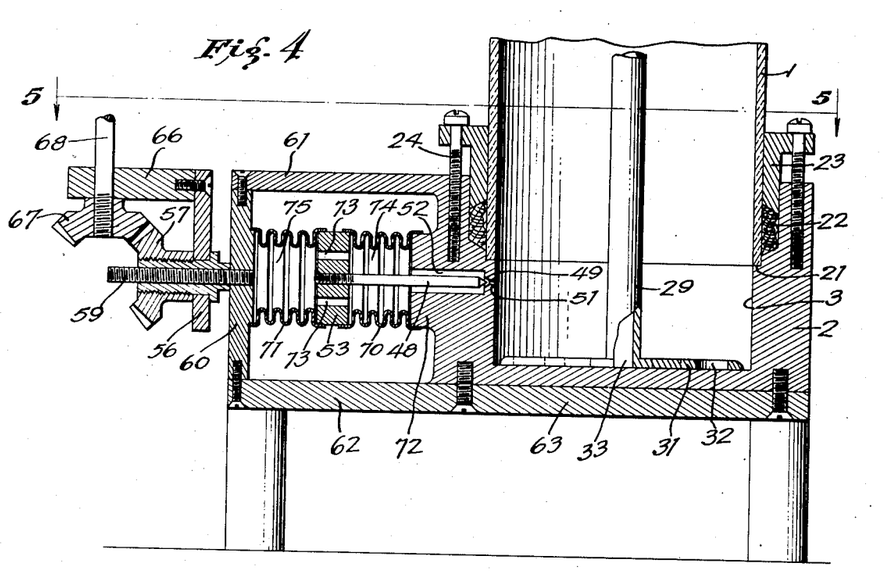
Fig. 4 is a vertical section on line 4—4 in Fig. 1, showing the lower portion of the settling tube and the valve means for controlling communication of pressure to the pressure responsive element.

The cover is provided with a central opening 28 to receive a hollow rod or tube 29, which extends therethrough to the bottom of the tube. The tube 29 is provided at its lower end with a flat disc or plate 31 provided with perforations 32 and adapted to serve as a plunger for thorough mixing of the contents of the settling tube as hereinafter described. When not in use for stirring purposes said plunger rests, as shown in Fig. 4, upon the bottom of recess 3. The tube 29 is open at its lower end as indicated at 33 and is connected at its upper end, preferably through a flexible hose connection 34, to a pipe 35 leading to any suitable source of suction. The connection from each tube 29 to the pipe 35 includes a cut-off valve 36. A pipe 37 is connected to a suitable source of supply of the liquid to be used in making the settling test, and a branch pipe 38 provided with cut-off valve 39 leads from said pipe through the rear cover portion 26″ and opens into the upper portion of each settling tube, as shown in Fig. 1.

In order to maintain an even pressure upon the upper surface of the liquid in the settling tube, a breathing device is provided so as to permit substantially free communication of pressure from the inside of said settling tube to the atmosphere, while at the same time preventing any appreciable escape therefrom of vapors of the liquid in the settling tube. Such breathing device as shown more particularly in Fig. 1a may comprise a small tubular receptacle 41 closed at its lower end and provided at its upper end with a stopper 42 carrying two small tubes 43 and 44. The receptacle 41 contains a small amount of liquid of the same composition as the liquid placed in the settling tube, and tubes 43 and 44 both terminate above the liquid level 45 in said receptacle. The tube 43 opens at its upper end into the settling tube beneath the cover, while the tube 44 projects through the rear cover portion 26″ and opens to the atmosphere. Since the liquid in receptacle 41 is naturally kept at the same temperature as that in the main settling tube, the vapor pressures are also equal and there is, therefore, no tendency for the liquid to evaporate from the main body of liquid in the settling tube and flow out through the tube 43. On the other hand, slight changes of atmospheric pressure will at once be transmitted to the inside of the settling tube, since there is a completely open passage for flow of air through tubes 43 and 44, and the pressure at the surface of the liquid in the settling tube is therefore at all times equal to the pressure outside. This is important, since the pressure which is measured is the difference between the pressure adjacent the bottom of the liquid column and atmospheric pressure. Due to the fact that the vapor pressure of the liquid in the receptacle 41 is always somewhat higher than it is outside the apparatus there will be a slight evaporation loss from this receptacle through tube 44 to the atmosphere, which may be replaced by adding liquid thereto from time to time, but there will be no evaporation loss from the liquid in the main settling tube 1.

Figure 5:
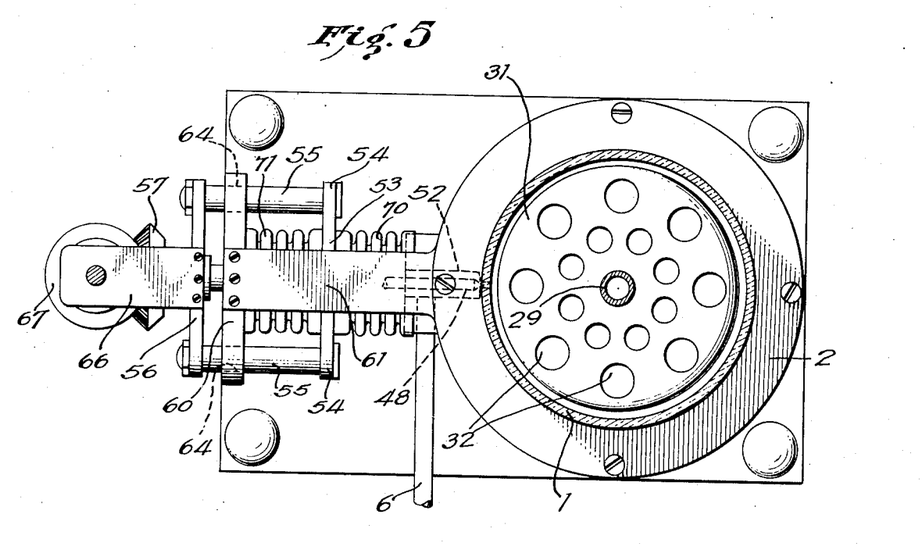
Fig. 5 is a section on line 5—5 in Fig. 4.

As stated above, pressure is communicated from a point near the bottom of the settling tube to the pressure responsive means, through pipes 6 and 7. I prefer to provide valve means for controlling such communication, and said valve means are preferably of the type shown in the drawings, so that opening or closing movement thereof causes no increase or decrease in pressure in said pipes or in the pressure responsive means. A needle valve member 48 is movable into or out of engagement with a tapered seat 49, and controls communication from the interior of recess 3 through opening 51 into passage 52, said passage in turn communicating with the pipe 6 (see Fig. 5). The opening 51 is located sufficiently above the bottom of recess 3 so as to provide a space therebeneath for settling of the solid material, so that said opening will not be obstructed by the settled material. The valve member 48 is secured to a head 53 provided with two laterally projecting arms 54 which are connected by rods 55 to a plate 56 in which is rotatably mounted a bevel gear 57. Said bevel gear is threadedly mounted upon a stem 59 secured to a plate 60 which is rigidly supported between an upper arm 61 extending from the base 2 and a lower arm 62 extending from a plate 63 secured beneath said base. The rods 55 are slidably journaled in openings 64 in plate 60. A strap 66 is secured to plate 56, and a second bevel gear 67, meshing with the bevel gear 57, is mounted at the lower end of a rod or shaft 68, whose lower end is rotatably journaled in said strap and whose upper end is provided with an operating handle 69 adjacent or somewhat above the upper end of the settling tube, or in any convenient position for operation. The head 53 of the valve member is connected by flexible enclosing means consisting preferably of flexible metal bellows elements 70 and 71 to a boss 72 on base 2 and to the fixed plate 60, and is provided with passages 73 establishing communication between the chambers 74 and 75 within the respective bellows elements. As indicated the chamber 74 communicates with passage 52 in which the valve member operates. It is evident that with such a valve construction there is no possibility of leakage, since the valve member is completely enclosed, and furthermore, opening or closing movement of said valve does not effect the pressure in passage 52 or pipe 6, for upon closing movement of said valve the fluid displaced from chamber 74 may pass through openings 73 to chamber 75 and upon opening movement of said valve a flow of fluid in the reverse direction takes place. It will be understood that by turning handle 69, gear 67 is caused to operate gear 57 and move the same inwardly or outwardly on stem 59. Plate 56 is caused to move therewith and operates through rods 55 to cause a corresponding movement of head 53 and valve member 48, into or out of engagement with seat 49.

In order to prevent any of the solid material from the settling tube reaching the pressure responsive means, a suitable solid-separating device 78 is preferably connected between pipes 6 and 7. Said device may consist, for example, of a settling chamber as shown, into which pipes 6 and 7 project, the pipe 6 preferably extending down to near the bottom thereof and the pipe 7 terminating at a somewhat higher level. Other means, such as a suitable filter device, may be connected between the pipes 6 and 7 instead of the settling chamber for the purpose of separating solid material from the liquid transferred through said pipes.

Figure 6:
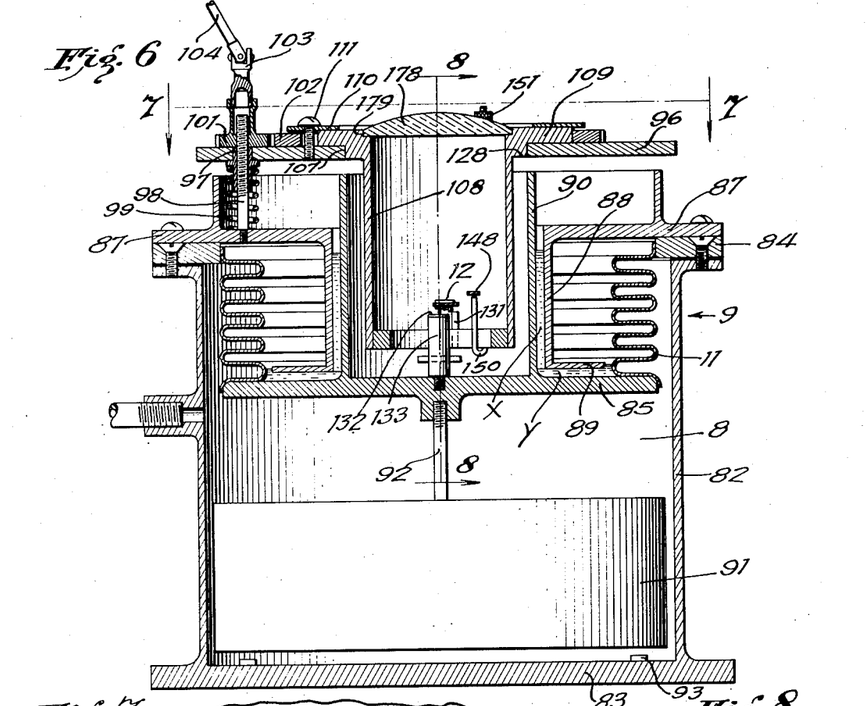
Fig. 6 is a vertical section of the pressure responsive unit shown in Fig. 1, and of the light reflecting means operated thereby, taken on line 6—6 in Fig. 7.
Figure 7:
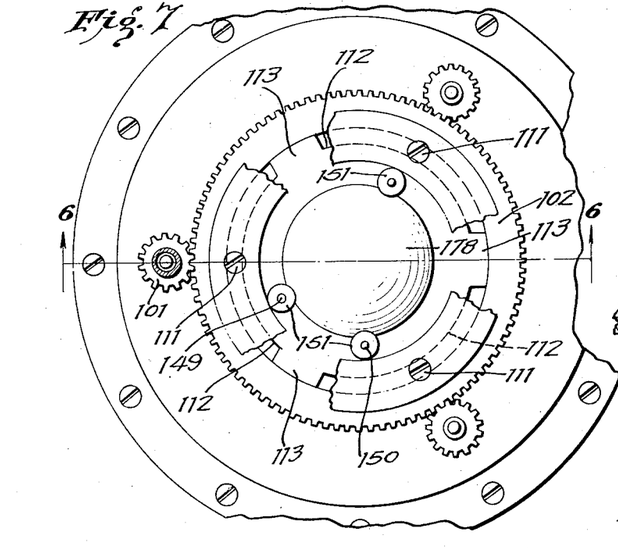
Fig. 7 is a plan view of the mirror supporting means taken on line 7—7 in Fig. 6.
Figure 8:
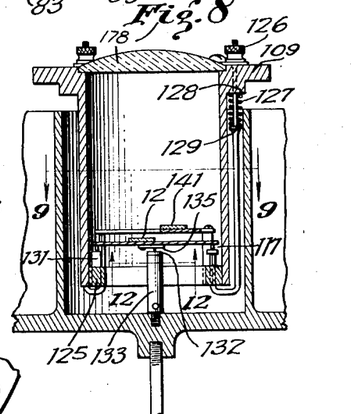
Fig. 8 is a vertical section of the mirrors and the supporting means therefor, taken on line 8—8 in Fig. 6.

The pressure responsive means 9 may comprise, as shown particularly in Figs. 6 and 7, a cylindrical vessel 82 having a closed bottom 83, an annular ring 84 secured to the flanged upper end of said vessel, a flexible metal bellows element 11 of general cylindrical shape, having its upper edge secured tightly to said ring and extending downwardly within the vessel 82, and a disc 85 secured tightly to the lower end of said pressure responsive element. A plate 87 is mounted above the annular ring 84 and is provided with a downwardly extending cylindrical position 88 extending within the pressure responsive element and having a flange 89 at its lower end.

The disc 85 is shown as provided with a cylindrical projection 90 extending upwardly within and spaced from the cylinder 88. The space $x$ between members 88 and 90, and the space $y$ between members 85 and 89 may, as shown, be filled with a suitable liquid, such as oil, for the purpose of damping or eliminating both horizontal and vertical high speed vibrations from outside sources. The cylindrical wall 90 serves to keep this damping liquid out of the space inside said cylinder, in which the mirror system is mounted. Cylindrical walls 88 and 90, with the liquid therebetween, serve as damping means to prevent horizontal vibration of the pressure responsive means and the light reflecting means operated thereby, while disc 85 and flange 89, with the liquid therebetween, serve as damping means to prevent vertical vibration thereof. A counter-balancing weight 91 is secured by rod 92 beneath the disc 85, the weight of said counter-weight determining the height of liquid column in tube 1 which will just "float" the bellows and said counter-weight. Small lugs 93 projecting upwardly from the bottom 83 serve to prevent the counter-weight 91 from contacting with the bottom of the pressure chamber and thus ensure free access of liquid beneath said counter-weight at all times. The weight of said counter-weight is so chosen that when tube 1 is filled with liquid alone to a certain height above the level of opening 51, the weight of the column of liquid will just overbalance the counter-weight and raise the same slightly off the lugs 93.

Within the cylindrical wall 90 and operatively connected with the pressure responsive element 11, are provided suitable light reflecting means for controlling the direction of a beam of light reflected therefrom in accordance with the movements of the said pressure responsive element. Said light reflecting means are shown as mounted upon a circular plate 96 supported by flanged sleeves 97 slidably mounted upon stems 98 secured to and projecting upwardly from the plate 87. Three of said stems are preferably provided as indicated in Fig. 7, so as to support the plate 96 at three points uniformly distributed about the center thereof. Coiled compression springs 99 engage beneath the flanges of the respective sleeves 97, while pinion gears 101 are threadedly mounted upon the upper ends of the respective stems 98 and bearing downwardly against the upper face of plate 96, the springs 99 serving to hold said plate up against said pinion gears. Said pinion gears are operatively connected by means of a gear ring 102 meshing therewith, and one of said pinion gears, as shown in Fig. 6, is connected through a universal joint 103 to the lower end of rod 104 which, as shown in Fig. 1, extends upwardly to a point outside the housing of the apparatus and is provided with a handle 105 in convenient position for manual operation thereof.

The plate is provided with a central recess 107 within which is mounted the cylindrical carriage 108 for the light reflecting means. Said cylindrical carriage is provided at its upper end with a flange 109 resting upon the plate 96 and clamped thereto by clamping ring 110 and screws 111. The flange 109 is provided at its periphery with three notches 112, through which the three screws 111 pass, said screws being threaded into the plate 96. Between said notches, said flange is provided with projections 113 engaging the inner face of the gear ring 102 and serving as bearing means therefor. Said gear ring is of less thickness than the flange 109, so that the clamping ring 110 does not clamp tightly or bind upon said gear ring, but serves to loosely retain the same in proper position.

Referring particularly to Figs. 8 to 12, the movable mirror 12 is mounted upon the upper face of a plate 115 which is supported on two relatively fixed bearing supports 116 and 117, formed as jeweled bearings of usual construction, and upon a movable bearing support 118. The jeweled bearing 117 is illustrated in detail in Fig. 11 and the other fixed bearing 116 is of similar construction. Such bearing comprises a pin 119 pointed at its lower end, resting upon a cap-jewel 120 and held in position by a ring-jewel 121. One of the relatively fixed bearings of plate 115 is preferably adjustable vertically. For this purpose the bearing 117, for example, may be mounted upon a member 122 secured to the upturned lower end of an adjusting screw 123 which is guided at 124 in a ring 125 secured inside the lower end of the cylindrical carriage 108. Said adjusting screw extends up through the flange 109 and is provided at its upper end with an adjusting nut 126 bearing against the upper face of said flange, a small coiled spring 127 engaging between an annular shoulder 128 on the carriage 108 and a shoulder 129 on said adjusting screw. The other fixed bearing 116 may be mounted upon a fixed post 131 rigidly secured in any suitable manner to the ring 125.

The movable bearing support 118 may comprise a pin 135, mounted upon an adjusting arm 136 pivotally mounted at 137 beneath the plate 115, the lower end of said pin being pointed and resting slidably upon a flat glass plate 132 or other smooth flat bearing surface means mounted at the upper end of a rod 133 secured to disc 85. An adjusting screw 138 is threadedly mounted in a downwardly projecting lug 139 on the bottom of said plate and bears against the outer end of arm 136 so as to force the same outwardly until the pin 135 is brought into proper position with respect to the axis of rotation of plate 115, said axis being the line connecting the bearing points of fixed bearings. This adjustment is for the purpose of adjusting the lever arm of the lifting motion applied to the mirror plate 115, and hence regulating the relation between the movement of the pressure-responsive element and the tilting of the mirror. The mirror 12 may consist of a small piece of flat mirrored glass or of polished metal or of any other suitable light reflecting means, secured in any suitable manner, as by means of suitable cement, to plate 115.

In order to afford a basis for measurement of the results obtained on the photographic plate, a relatively fixed mirror 141 is preferably mounted alongside the movable mirror 12. Said last named mirror is relatively fixed in the sense that it normally remains fixed throughout any particular test, but means are preferably provided for tilting the same independently about two perpendicular axes so as to cause the beam of light reflected thereby to fall in the desired position on the photographic plate. For this purpose said fixed mirror may be mounted upon an L-shaped plate 142 formed of a resilient metal. At the corner of the L, said plate is provided with an outward projection 143 forming a resilient arm resting at its outer end upon a post 144 and secured thereto by means of screw 145. The post 144 may be rigidly secured to ring 125. The respective extremities of the L-shaped plate 142 rest, as at 147 and 148, upon the inwardly turned lower ends of adjusting screws 149 and 150. Each of said adjusting screws extends at its upper end freely through the flange 109 and is provided with an adjusting nut 151, and is also provided with a spring 152 engaging between the shoulder 128 aforesaid and a shoulder 153 on the adjusting screw. The arrangement is such that the resilience of plate 142 itself holds the extremities thereof down against the ends of the adjusting screws, and each of said adjusting screws is raised or lowered by operation of nuts 151 to tilt mirror 141 in either direction for adjustment of the beam of light reflected thereby to the proper position upon the photographic plate.

In order to eliminate errors, due to unequal expansion or contraction of the metal parts supporting the fixed and movable bearings of mirror 12 and consequent tilting of said mirror, upon variation in temperature, I prefer to make these parts of metal having a suitable coefficient of expansion. Vertical movement of the relatively fixed bearing points is effected by vertical expansion or contraction of the members 98, 108, 123, and 131, while vertical movement of the relatively movable bearing point is effected by vertical expansion or contraction of the members 11 and 133. These several members should therefore preferably be made of such metals that any vertical movement of the fixed bearing points, upon variation in temperature, will substantially equal the vertical movement of the movable bearing point for the same temperature variation.

Figures 9, 10, 11, 12, 13, 14:
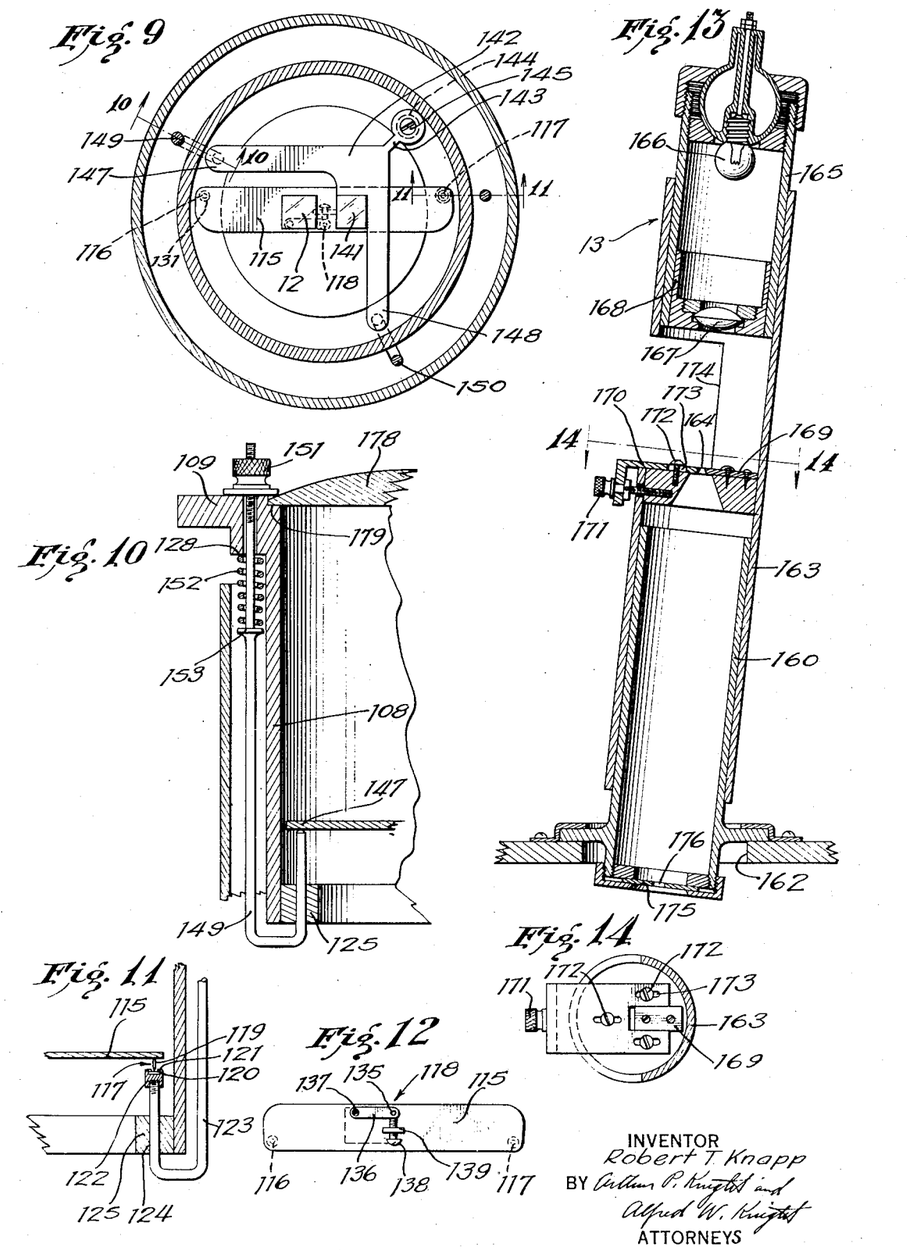
Fig. 9 is a horizontal section on line 9—9 in Fig. 8, showing the mounting of the light reflecting means.
Fig. 10 is a section on line 10—10 in Fig. 9.
Fig. 11 is a section on line 11—11 in Fig. 9.
Fig. 12 is an inverted horizontal section on line 12—12 in Fig. 8.
Fig. 13 is a vertical section of the means for producing and controlling the beam of light used for making the record on the photographic plate.
Fig. 14 is a section on line 14—14 in Fig. 13.

The means indicated at 13 in Fig. 1, for producing a beam of light and directing the same upon the mirrors above described, are shown in greater detail in Figs. 12 and 13. Such means may comprise a tube 160 secured to the top wall of the housing and projecting through an opening 162 therein, a second tube 163 slidably mounted on said first named tube and provided with means defining a slot indicated at 164, and a third tube 165 slidably mounted within the upper end of tube 163 and provided with a source of light such as electric light bulb 166. A small double convex lens 167 is mounted in a tubular piece 168 slidably mounted within the tube 165 so as to permit the desired focusing of a beam of light from the source 166. The slot 164 is defined by a fixed plate 169 and a movable plate 170 mounted to slide toward or away from the outer edge of said fixed plate so as to vary the width of said slot, and hence the thickness of the beam of light projected therethrough. Adjustment of the sliding plate 170 may be effected by means of adjusting screw 171, while said plate is slidably held in position by means of screws 172 passing through slots 173 therein. The tube 163 is preferably partly cut away above the slot-defining means, as shown at 174, so as to permit free view thereof for the purpose of adjusting the width of the slot. A plate 175 may be mounted at the lower end of tube 160, said plate having an opening 176 of such shape and size as to confine the beam of light from slot 164 to substantially the area occupied by the two mirrors 12 and 141.

A lens 178 may be mounted in a recess 179 at the upper end of the mirror carriage 108, for directing the beam of light from the above described projecting means onto the mirrors. The adjusting nuts 126 and 151 aforesaid, are shown as projecting somewhat over the edge of recess 179, so as to retain said lens in position therein.

The top wall of the housing is provided with an elongated opening 181 above which is mounted the light-proof box 182 having a light-proof sliding cover 183. The bottom wall of box 182 is provided with an elongated opening 181′ registering with opening 181. In the opening 181′ is mounted a cylindrical condensing lens 216, the axis of which extends parallel to the plane of movement of the beam of light reflected from mirror 12. The ends of said lens rest in recesses 217, and are held in position by straps 218 secured to the bottom wall of box 182. The function of this lens is to produce a lateral convergence of the reflected beams of light from both the relatively fixed and movable mirrors, so that the entire beam from each mirror is condensed and caused to strike the photographic plate at substantially a single point. This not only increases the sharpness and accuracy of the photographic record, but also increases the intensity of light received thereby and thus gives a strong photographic reproduction. Extending transversely inside box 182 are two guide rods 184, and a plate carriage 185 is slidably supported between said rods as, for example, by means of grooved rollers 186. The rollers at one side of the plate carriage may be mounted betwen ears 187 rigidly secured thereto, while the rollers at the other side of the carriage may be mounted between ears 188 mounted at the ends of a spring metal strap 189 which is secured at its center as at 190 to the plate carriage. The purpose of the spring 189 is to permit the rollers 186 carried thereby to be pressed inwardly toward the plate carriage so as to release the same from engagement with rod 184 and allow the plate carriage to be lifted about the other rod for the purpose of returning the same to its starting position at the beginning of each test. The plate carriage may be further provided with a U-shaped strap 192 extending loosely around the guide rod 184 so as to prevent displacement thereof from said guide rod when it is tilted upwardly as above mentioned.

The plate carriage 185 is provided with a recess 193 for receiving a photographic plate, which may if desired be held therein by any suitable means. Said plate carriage is further provided with a block 194 secured to its under side and having a screw threaded portion 195 engaging a screw threaded portion 196′ of actuating shaft 196. Said shaft is rotatably mounted in the end walls of box 182, and projects through a light-proof stuffing box 198 at one end where it is provided with a pinion gear 199.

Figure 15:
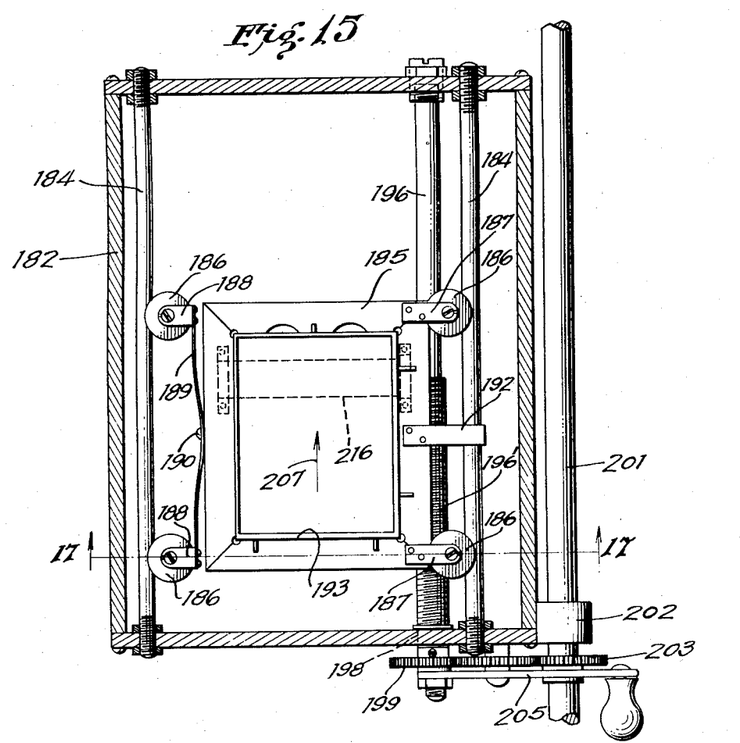
Fig. 15 is a plan view of the carriage for the photographic plate upon which the results of the test are recorded, and the means for moving the same.

A drive shaft 201, rotatably supported in bearing means 202, extends parallel to the shaft 196 and is provided with a pinion 203 which is aligned within but spaced from the pinion 199. An intermediate pinion 204 is mounted upon arm 205 which is pivotally mounted as, for example, on the projecting end of shaft 196, so as to be swung into or out of position to mesh with the two pinions 199 and 203. When in said position, the shaft 196 is operatively connected to shaft 201 for rotation thereby. The driving shaft 201 may be driven in any suitable manner as, for example, by means of a clockwork mechanism not shown, so as to provide a constant rate of travel of the photographic plate across the opening 181. The threaded portion 196′ of shaft 196 is preferably of a length substantially equal to the length of the photographic plate. For example, in the particular construction shown in Fig. 15, the plate carriage is initially in a position at the end of box 182 nearest the driving gear 199; and is adapted to be moved in the direction indicated by the arrow at 207, and the threaded portion 196′ terminates at such position that when the last portion of the photographic plate has passed across the opening 181 the threaded block 194 will pass off the screw threads 196′, so that continued rotation will not cause further movement of the plate carriage, thus preventing damage to any of the parts and obviate the necessity for careful watching of the apparatus, so as to stop the plate carriage immediately upon completion of each test.

An inclined mirror 210 is mounted below the top wall of the housing, said mirror being adapted to reflect light from the lower face thereof and extending downwardly and inwardly to a position indicated at 211, so as not to intercept any light rays from the mirrors of the pressure responsive device which would otherwise reach the photographic plate, but to intercept a light ray, such as indicated at 212, which is reflected too far forward to strike the plate carriage. A ground glass plate 213 is mounted in an opening 214 in the front wall of the housing and a suitable indicating mark 215 is provided on or adjacent said ground glass so as to indicate when the measuring mirror is in proper position for starting a test as hereinafter described.

The housing in which the above described testing units are enclosed is shown as comprising, in addition to the glass front wall 225 aforesaid, a top wall portion 226 extending back some distance beyond the row of settling tubes 1 and provided with openings 227 into which the upper ends of said tubes project, an inwardly offset front wall portion 228 extending up from said top wall portion, a second top wall portion 229 extending back from the upper end of wall portion 228, a rear wall 230, and a bottom wall 231. Said walls are preferably made of, or covered with, suitable heat insulating material, and the transparent front wall 225 preferably comprises two spaced glass plates, as shown, this construction being such as to assist in the maintaining of a substantially constant temperature of all the apparatus enclosed within the housing, and particularly of the settling tubes and their contents. The housing further includes vertical wall 261 extending behind the row of settling tubes, and a horizontal wall 262 extending over the corresponding pressure responsive devices 9, said vertical and horizontal walls cooperating with top wall 229 and rear wall 230 to enclose a substantially light-proof chamber 263 through which the beams of light are projected, so that the photographic recording plate will be unaffected by any other light than that of said beams. The wall 262 may be provided with an opening 264 fitting around the upper part of each pressure responsive device 9. In order to still further prevent access of stray light to chamber 263, a curtain 265 of suitable light absorbing material, such as black felt, is also preferably provided, having an opening 266 for passage of the light beams therethrough. The flues 235 and 237 for circulation of the constant temperature gaseous medium extend throughout the length of the housing, and are provided with openings 238 and 239 adjacent the respective testing units. Each of said openings is provided with a sliding door or damper for adjustment of the size of the openings, so as to permit the desired circulation of the gaseous medium therethrough.

In making a test of the fineness of a sample of powdered material with the above apparatus, a photographic plate is first placed in position on the plate carriage 185, said plate carriage being in the starting position above mentioned. A certain predetermined quantity of liquid, such as kerosene, is then placed in tube 1, and the valve member 48 is then opened by operation of handle 69. It will be understood that pipes 6 and 7, separating device 78, and the pressure chamber 8 of the pressure responsive device 9 are normally filled at all times with a liquid of the same character as that placed in tube 1, so that upon operating said valve there is only a slight movement of liquid in one direction or the other therethrough, but the hydrostatic pressure at the bottom of tube 1 is transmitted through said liquid medium to the pressure chamber 8, causing the pressure responsive element 11, and consequently the measuring mirror 12, to assume a certain position corresponding to the degree of compression of the bellows element 11 by the pressure in said pressure chamber.

The relatively fixed mirror 141 having previously been adjusted so as to reflect the beam of light falling thereon in a certain direction and cause the same to strike the photographic plate in a certain definite position, the measuring mirror 12 is now adjusted by raising or lowering the entire mirror carriage through operation of handle 105, until the beam of light reflected from said measuring mirror follows the path indicated at 212 in Fig. 1, and strikes the ground glass plate in the position of the mark 215. The position of mark 215 is so chosen that the deflection of measuring mirror 12 caused by an increase in hydrostatic pressure corresponding to the addition of a certain predetermined weight of material to the liquid column in tube 1 will be just sufficient to deflect the light beam reflected thereby from the direction indicated at 212 to a direction parallel to that of the light beam reflected by the relatively fixed mirror.

Figure 16:
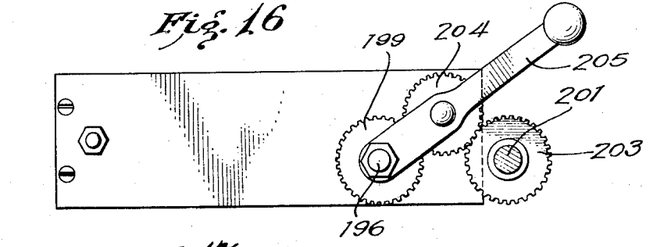
Fig. 16 is an end view thereof.
Figure 17:
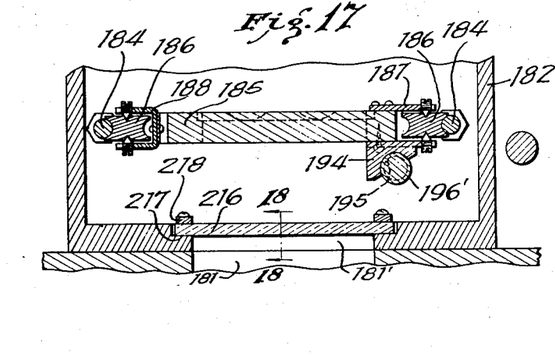
Fig. 17 is a section on line 17—17 in Fig. 15.
Figure 18:
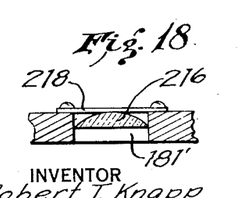
Fig. 18 is a section on line 18—18 in Fig. 17.

Valve member 48 is then closed and the above mentioned predetermined weight of powdered material to be tested is then introduced into the liquid column, the front cover portion 26' being removed for this purpose and then replaced. The liquid column in tube 1 is then preferably agitated, by raising and lowering tube 29 and the perforated plunger 31, so as to thoroughly mix the powdered material in the liquid and bring the same into uniform suspension throughout the height of the column. The particular form of agitating means shown, comprising rod 29, with the perforated disc 31 at its lower end, is especially advantageous, for vertical movement thereof serves to thoroughly distribute the material in the liquid, without setting up persistent eddy currents in the liquid column, such as are caused by other forms of agitating means. The movements of the liquid caused by said agitating means are of such type as to cease almost immediately upon stopping the agitating means, so that the rate of settling of the material to be tested is unaffected by such movements. When the agitation is complete, the valve member 48 is again opened and the photographic plate is started in motion across the opening 181, by lowering the pinion 204 to position shown in Fig. 16.

The increased pressure at the bottom of the settling tube, due to the weight of the solid particles suspended therein, is transmitted through pipes 6 and 7 to the pressure chamber 8 and compresses the pressure responsive element 11, causing disc 85 to rise and lift the forward edge of mirror 12, so that the beam of light reflected therefrom is deflected to some position such as indicated at 212' in Fig. 1, and falls upon the photographic plate 14, in a position corresponding to the pressure in the pressure chamber and hence to the weight of material in suspension in the settling tube.

The solid particles settle toward the bottom of the settling tube at a rate dependent upon the size thereof, and as such particles settle out, the weight of the column of liquid, and consequently the pressure in the pressure chamber, gradually decreases. The pressure responsive element therefore expands, tilting the mirror forwardly, and causing the reflected light beam to move forward on the photographic plate concurrently with the transverse motion of the plate, until the beam of light finally reaches some such position as shown at 212'', so that a curved line representing the rate of settling, and hence the proportional distribution of particles of different size in the material being tested, is traced by such light beam upon the photographic plate.

Simultaneously, the beam of light from the relatively fixed mirror 141, whose position is approximately parallel to the final position 212'' of the moving beam, traces a straight line on the photographic plate, which furnishes a basis for measurement, the distance between the two lines at points corresponding to any certain time giving an indication of the proportion of material remaining in suspension in the liquid column at that time. A permanent photographic record of the results of each test is thus furnished, from which the proportional amounts of particles of different size can be readily calculated.

Instead of agitating the liquid column so as to uniformly distribute the finely divided material in suspension throughout the height thereof, it may in some cases be advantageous to simply deposit all the finely divided material in a layer at the top of the column of liquid at the start of the test, so that all of the material has to fall through the entire height of the column before being removed from suspension therein.

I claim:

1. An apparatus for measuring fineness of finely divided solid materials comprising a settling tube adapted to contain a column of liquid, means permitting introduction of a sample of finely divided solid material into said settling tube, so as to cause the particles of said material to settle toward the bottom of said settling tube at a rate dependent on the fineness thereof, and means for recording variations in pressure in said settling tube at a point below the top of said liquid column during a certain period of time following the start of the settling operation.

2. In an apparatus for measuring fineness of finely divided solid materials, a settling tube, a column of liquid in said tube, means for measuring variations in the relation between atmospheric pressure and the pressure in said settling tube at a point below the top of said liquid column, a cover for said tube, and breathing means within said tube and having a communication with the atmosphere outside said tube and adapted to permit unobstructed inflow or outflow of air between the interior of the tube and the outside atmosphere but to prevent outflow of vapors arising from the liquid in said settling tube.

3. An apparatus as set forth in claim 2, said breathing means comprising a closed receptacle containing a body of liquid of the same character as that in the settling tube, a gas passage tube establishing communication between the interior of said receptacle above the liquid level therein and the interior of the settling tube above the liquid level therein, and a second gas passage tube establishing communication between the interior of said receptacle above the liquid level therein and the outside atmosphere.

4. An apparatus for measuring fineness of finely divided solid materials comprising a settling tube, pressure responsive means provided with a pressure chamber and a pressure responsive element movable in response to variations in pressure in said pressure chamber, means establishing communication between said pressure chamber and the lower portion of said settling tube, and means for measuring movements of said pressure responsive element.

5. An apparatus for measuring fineness of finely divided solid material comprising a settling tube, means defining a pressure chamber, means for measuring variation in pressure in said pressure chamber, passage means connecting said pressure chamber to said settling tube at a point below the top thereof, and valve means adapted to be moved into position to open or close said passage means while leaving the pressure in the pressure chamber unaffected by the movement of said valve means.

6. In combination with passage means, a port therein, a valve member reciprocable into position to close or open said port, a reciprocating member connected to said valve member, a flexible walled closed bellows element at each side of said reciprocating member, the space within one of said bellows elements opening into said passage means, and means establishing communication between the interior of the two bellows elements.

7. An apparatus for measuring fineness of finely divided solid materials comprising a settling tube, pressure responsive means provided with a pressure chamber and a pressure responsive element movable in response to variations in pressure in said pressure chamber, passage means establishing communication between said pressure chamber and the lower portion of said settling tube, means connected in said passage means for removing solid particles from liquid passing therethrough, and means for measuring movements of said pressure responsive element.

8. An apparatus for measuring fineness of finely divided solid materials comprising a settling tube, pressure responsive means provided with a pressure chamber and a pressure responsive element movable in response to variations in pressure in said pressure chamber, passage means connecting said pressure chamber to a point in said settling tube below the upper end thereof, a counterbalancing weight connected to said pressure responsive element and determining the pressure required to operate the same, and means for measuring movements of said pressure responsive element.

9. An apparatus for measuring fineness of finely divided solid materials comprising a settling tube, pressure responsive means provided with a pressure chamber and a pressure responsive element movable in response to variations of pressure in said pressure chamber, passage means connecting said pressure chamber to a point in said settling tube below the upper end thereof, damping means tending to prevent high speed vibration of said pressure responsive element, and means for measuring movements of said pressure responsive element.

10. An apparatus for measuring fineness of finely divided solid material comprising a settling tube adapted to contain a column of liquid of considerable height, pressure responsive means provided with a pressure chamber and a pressure responsive element movable in response to variations in pressure in said pressure chamber, means establishing communication between said pressure chamber and said settling tube at a level a considerable distance below the position of the top of said liquid column, a mirror adapted to be tilted by movements of said pressure responsive element, means for directing a beam of light upon said mirror, and means for measuring movements of the resulting beam of light reflected from said mirror.

11. An apparatus for measuring fineness of finely divided solid material comprising a settling tube adapted to contain a column of liquid of considerable height, pressure responsive means provided with a pressure chamber and a pressure responsive element movable in response to variations in pressure in said pressure chamber, passage means connecting said pressure chamber to said settling tube at a level below the position of the top of said liquid column, a mirror supported upon fixed bearing point means and upon bearing point means connected to said pressure responsive element, means for directing a beam of light upon said mirror, and means for measuring movements of the resulting beam of light reflected from said mirror.

12. An apparatus for measuring fineness of finely divided solid material comprising a settling tube, pressure responsive means provided with a pressure chamber and a pressure responsive element movable in response to variations in pressure in said pressure chamber, passage means connecting said pressure chamber to said settling tube below the upper end thereof, two relatively fixed bearing points, a single bearing point supported upon and movable with said pressure responsive element, said last named bearing point being spaced from an axis connecting said relatively fixed bearing points, a mirror supported upon said relatively fixed and movable bearing points, means for directing a beam of light upon said mirror, and means for measuring movements of the resulting beam of light reflected from said mirror.

13. An apparatus for measuring fineness of finely divided solid material comprising a settling tube, pressure responsive means connected to the lower portion of said settling tube, reflecting means operatively connected to said pressure responsive means, so as to be tilted in accordance with the pressure therein, means for directing a narrow beam of light upon said reflecting means, and means for recording movements of the beam of light reflected thereby.

14. An apparatus for measuring fineness of finely divided solid material comprising a settling tube, a pressure chamber connected to the lower portion of said settling tube, a pressure responsive element actuated by the pressure in said pressure chamber, reflecting means operatively connected to said pressure responsive element, so as to be tilted in accordance with movements thereof, means for directing a narrow beam of light upon said reflecting means, means for supporting a photographic plate in position to intercept the beam of light reflected thereby, and means for moving said plate supporting means at a uniform rate in a direction transverse to the movements of the reflected light beam caused by tilting of said reflecting means.

15. An apparatus for measuring the fineness of finely divided solid material comprising a settling tube, a pressure chamber connected to the lower portion of said settling tube, a pressure responsive element actuated by the pressure in said pressure chamber, reflecting means operatively connected to said responsive element, so as to be tilted in accordance with movements thereof, means for directing a narrow beam of light upon said reflecting means, means for supporting a photographic plate in position to intercept the beam of light reflected from said reflecting means, and a cylindrical condensing lens positioned between said reflecting means and said photographic plate with its axis parallel to the plane in which the reflected beam of light moves upon tilting of said mirror and adapted to focus the reflected beam of light substantially to a single point at the sensitive surface of said photographic plate.

16. An apparatus for measuring fineness of finely divided solid material comprising a settling tube, a pressure chamber connected to said settling tube below the upper end thereof, a pressure responsive element actuated by the pressure in said pressure chamber, reflecting means operatively connected to said pressure responsive element, so as to be tilted in accordance with movements thereof, means for directing a narrow beam of light upon said reflecting means, means for supporting a photographic plate in position to intercept the beam of light reflected thereby, an actuating member extending adjacent said plate supporting means, means on said plate supporting means adapted to engage said actuating means to effect movement of said plate supporting means in a direction transverse to the movement of the reflected light beam caused by tilting of said reflecting means, and means for automatically stopping said plate supporting means when the photographic plate reaches a given position, regardless of continued movement of said actuating means.

17. An apparatus for measuring fineness of finely divided solid material comprising a settling tube, a pressure chamber connected to the lower portion of said settling tube, a pressure responsive element actuated by the pressure in said pressure chamber, a relatively fixed mirror, a movable mirror operatively connected to said pressure responsive element, so as to be tilted in accordance with movements thereof, means for supporting a photographic plate in position to intercept the beams of light reflected from both of said mirrors, and for moving said photographic plate at a uniform rate in a direction transverse to the direction of movement of the light beam reflected from the movable mirror.

In testimony whereof I have hereunto subscribed my name this 7th day of March, 1929.

ROBERT T. KNAPP.